United States Patent Office 3,459,280
Patented Aug. 5, 1969

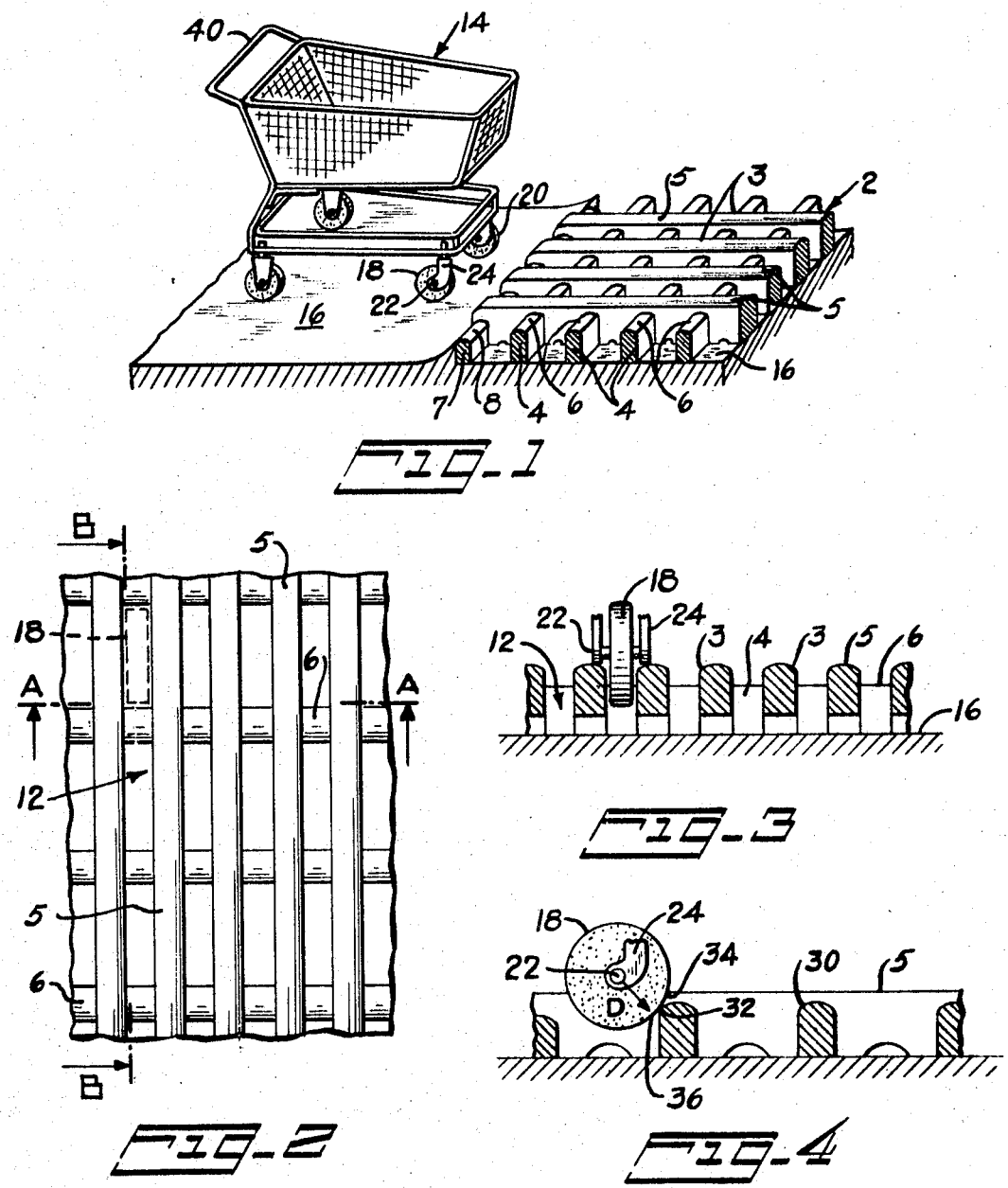

3,459,280
BOUNDARY BARRIER
William K. Grimm, 1000 SE. 4th St., Apt. 124,
Fort Lauderdale, Fla. 33316
Filed Jan. 8, 1968, Ser. No. 696,373
Int. Cl. F16d *63/00;* E01c *9/10;* B60t *3/00*
U.S. Cl. 188—32                5 Claims

ABSTRACT OF THE DISCLOSURE

This invention relates to a new and improved boundary barrier for certain wheeled vehicles, and, more particularly, to a device for prohibiting removal of certain wheeled vehicles from a particular area in order to prohibit unauthorized, off premises use of the wheeled vehicle.

BACKGROUND OF THE INVENTION

As is perhaps well known, various ground level structures have been used in roads, sidewalks, and other types of ways to limit the movement of animals from one area to the next. Such structures have been designed to prevent the movement of cattle from one area to the next but to allow motor vehicles and pedestrians to move freely over the structures. These structures have been designed to allow automobile wheels to pass freely over the structure and to allow pedestrians to walk over the device without interference. Also, in the past, various automatic braking means have been connected to vehicles and triggered by various structures to actuate the braking means when the vehicle moves over the structure. The use of combination braking means and triggering structures are costly to manufacture and install.

SUMMARY OF THE INVENTION

The present invention relates to a new and improved boundary barrier for prohibiting the movement of certain wheeled vehicles or carts from one particular area to another. The boundary barrier is placed in a roadway, or other way for allowing automobiles to pass freely thereover but prohibiting the movement of certain wheeled vehicles over the barrier. The boundary barrier includes a plurality of longitudinal members having upper faces on one plane and transverse members having upper faces in another plane. The members jut or project upwardly from the base of each member to the upper face of each member to surround a plurality of wheel traps. The wheel traps are aligned in spaced-apart columns in order to place one of the wheel traps below at least one of the spaced-apart wheels on the wheeled vehicle when the vehicle is moved over the boundary barrier. Each of the indented faces have a length greater than the square root of two times the radius of a wheel on the wheeled vehicles and a width greater than the width of the outer circumferential surface of the wheel. A portion of the wheel will therefore descend below the upper faces of the members. The projecting members surround each wheel trap in the boundary barrier and prohibit movement of the vehicle over the boundary barrier. The projecting members jut upwardly in order to provide an upper edge at the end of the wheel trap to engage the outer circumferential surface of the wheel near the leading surface of the wheel to require the wheel to be raised over the upper face in order to remove the wheeled vehicle from each trap.

It is an object of this invention to provide a non-complex boundary barrier to prohibit movement of certain wheeled vehicles over the barrier.

It is another object of this invention to provide a low cost boundary barrier for particular wheeled vehicles that may be manufactured and installed at low cost and require little or no maintenance.

A further object of this invention is to provide a boundary barrier including a plurality of vehicle-wheel traps that engage the circumferential outer surface of a wheel on a wheeled vehicle adjacent to the leading edge of the wheel to prohibit movement over the barrier.

In accordance with these and other objects which will be apparent hereinafter, the instant invention will now be described with particular reference to the accompanying drawing.

BRIEF DESCRIPTION OF THE DRAWING

In the drawing:
FIGURE 1 is a perspective view of a wheeled vehicle adjacent to a boundary barrier;
FIGURE 2 is a plan view of a boundary barrier;
FIGURE 3 is an extended cross-sectional view of the boundary barrier taken along line A—A of FIGURE 2 and looking in the direction of the arrows; and
FIGURE 4 is an extended cross-sectional view of the boundary barrier taken along the line B—B of FIGURE 2 and looking in the direction of the arrows.

DESCRIPTION OF THE PREFERRED EMBODIMENT

Referring now in detail to the drawing, wherein an embodiment of the invention is shown, and referring particularly to FIGURE 1, the boundary barrier, generally designated as numeral 2, comprises a plurality of longitudinal members 3 and transverse members 4, each of which includes upper faces. The upper faces 5 of longitudinal members 3 are in a first plane. The majority of upper faces 6 of the transverse members 4 are in a second plane that is lower then the first plane. The leading transverse member 7 has an upper face 8 in a third plane that is lower than the second plane. The upper face 8 is level with or lower than the surface of the way leading to the boundary barrier 2.

Each barrier 2 includes a plurality of vehicle-wheel traps generally designated as numeral 12. A wheeled vehicle 14, such as a shopping cart, is shown on way 16 approaching boundary barrier 2. The way 16 is shown as a sidewalk leading to an exit from a shopping area. The boundary barriers are used in the ways and ordinary means, such as fences are used between the ways to restrict the movement of the carts to a particular area.

Various configurations of the barrier 2 may be necessary for a specific wheeled vehicle. One embodiment of the barrier is shown in FIGURE 2. The vehicle-wheel traps 12 are arranged in a pattern to insure that the movement of a wheeled vehicle over the barrier is prohibited. A plurality of columns of vehicle-wheel traps 12 spaced a distance apart to insure that at least one wheel 18, shown in dotted lines, of cart 14 will move over a wheel trap 12 when the cart moves across the barrier 2. The other set of wheels 20 may or may not move along the upper face 5 of the barrier 2.

The cart 14 customarily has wheels that swivel.
An alternate means preventing the cart 14 from being successfully negotiated by diagonal movement over the embodiment is shown in FIGURE 3. The longitudinal members 3 project to jut upwardly above the upper face of transverse members 3. When the cart is moved diagonally over the boundary barrier, the sides of member 3 will turn or deflect the leading wheels of the cart so that the wheels will fall into the vehicle-wheel trap.

Now referring to FIGURES 3 and 4, the vehicle-wheel traps have a length greater than the square root of two times the radius of a wheel on the wheeled vehicle 14 and a width greater than the width of the outer circumferential surface of the wheel in order to allow the wheel to drop into a vehicle-wheel trap 12 as it passes over a trap. In the embodiment shown in FIGURE 3, the width of each vehicle-wheel trap 12 is great enough to allow the wheels 18 or 20 to drop into the trap. The wheel 18 is connected to axle 22 which, in turn, is connected to the cart 14 by swivel holding members 24. When the narrow width traps 12, as shown in FIGURES 3 and 4, are utilized, the wheel 18 will drop into the trap to prevent the cart from being moved forward on the wheel. The trap dimensions are small enough to allow free movement of vehicles having larger wheels over the barrier.

The upper edge 30 of the transverse member 4 is designed to contact the wheel surface at 32 near the leading wheel surface 34. The critical point below which the contact point 32 of the wheel should not fall is point 36. Point 36 is located at the intersection of vector, shown as arrow D, and the circumferential surface of the wheel. The vector force on the axle 22 is applied by a person pushing the handle 40 of the cart 14 in a normal manner, as shown in FIGURE 1. When the contact point 32 is above point 36 only a minute portion of the normal force applied to the cart 14 will tend to force the wheel over the upper edge of the projecting member 10. If the contact point 32 were below point 36 the restrictive barrier 2 would not adequately prohibit the movement of the carts over the barrier.

In use the vehicle-wheel traps will be sized and spaced apart specific distances to allow the wheels of the particular carts to move into the vehicle traps. The leading surface of the wheel, as shown in FIGURE 4, will be adjacent to or near the line of engagement of the wheel and the upper edge 30 of the transverse members 4. This configuration will provide a barrier that prohibits forward movement of the wheeled vehicle caught in the vehicle trap 12. Various patterns may be designed to insure that at least one wheel will fall into a trap.

The instant invention has been shown and described herein in what is considered to be the most practical and preferred embodiments. It is recognized, however, that departures may be made therefrom within the scope of this invention. Therefore this invention is not to be limited to the details disclosed herein but to embrace any and all equivalent apparatus and articles.

What is claimed is:

1. An alternate boundary grid passageway and barrier for temporary entrapment of wheeled carts having wheels of comparative minimal diametric dimension and for the passage of automobiles having wheels of maximum diametric dimension comprising:
  (A) plural cart wheel abutments set transversely spaced apart at a distance which is greater than the radius and less than the diameter of any one cart wheel, said abutments extending downwardly to a depth which is at least half the radius of any one cart wheel; and
  (B) plural cart wheel guides, said guides being set in acute angular relationship to the abutments and spaced apart a distance which is in excess of the width of any one cart wheel, said guides extending in a higher plane than the respective said plural abutments, to form with the plural abutments, individual cart wheel traps for any one cart wheel, said plural cart wheel guides simultaneously providing passageway for automobile wheels.

2. The vehicular barrier of claim 1 in which said wheel abutments are spaced apart at least a distance which is equal to the radius multiplied by the square root of 2 of any one wheel on a wheeled vehicle of no-entry, to provide thereby an effective barrier against removal of said wheeled vehicles of no-entry.

3. The barrier of claim 1 in which the abutments and guides are set at right angles to one another, forming thereby transversely and longitudinally aligned wheel traps.

4. The barrier of claim 3 in which the wheel abutments extend downwardly to a depth which is at least half the radius of a wheel of a vehicle of no-entry.

5. The vehicular barrier of claim 3 in which the vehicular wheel abutments extend to a depth which is at least equal to the radius of any wheel of a vehicle of no-entry.

References Cited

UNITED STATES PATENTS 1,582,188   4/1926   Mummert _____ 244—110.1
3,265,157   8/1966   Rissler _____ 186—1.1

FOREIGN PATENTS 580,878   8/1958   Italy.

MILTON BUCHLER, Primary Examiner
THOMAS W. BUCKMAN, Assistant Examiner

U.S. Cl. X.R.

94—1; 186—1; 238—14